Oct. 25, 1966  G. H. BAUERLEIN  3,281,682
HALL EFFECT TACHOMETER USING AN EDDY-CURRENT ROTOR AND
FLUX FOCUSING ELEMENTS
Filed Nov. 6, 1962  3 Sheets-Sheet 1
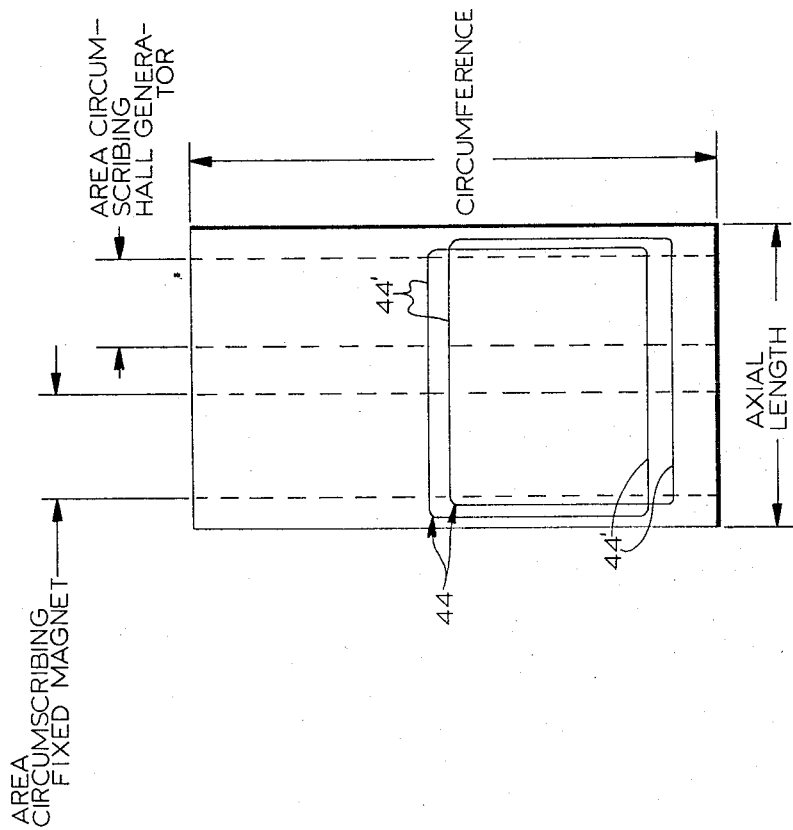
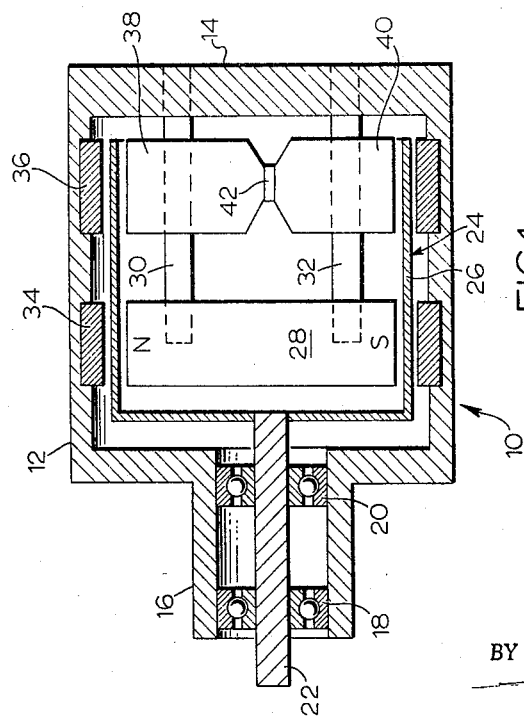
GERHARD H. BAUERLEIN
INVENTOR.
BY S. A. Giarratana
Francis L. Masselle
ATTORNEYS Oct. 25, 1966          G. H. BAUERLEIN          3,281,682
HALL EFFECT TACHOMETER USING AN EDDY-CURRENT ROTOR AND
FLUX FOCUSING ELEMENTS
Filed Nov. 6, 1962                                3 Sheets-Sheet 2
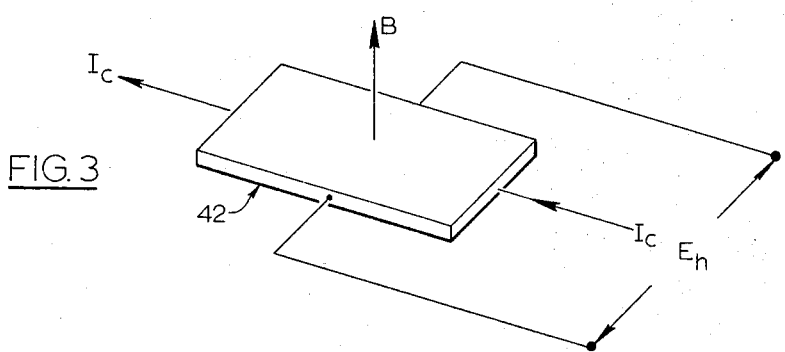
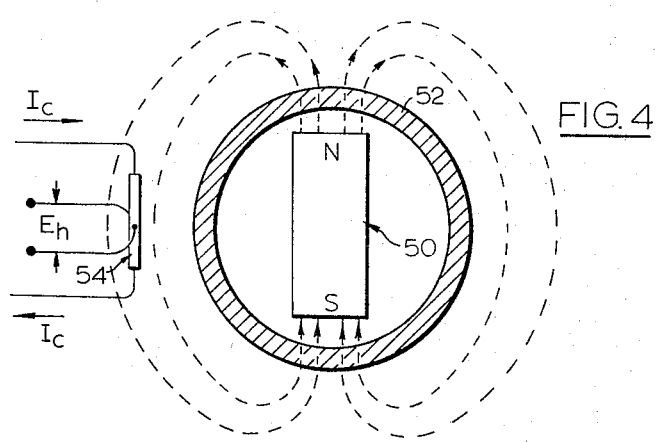
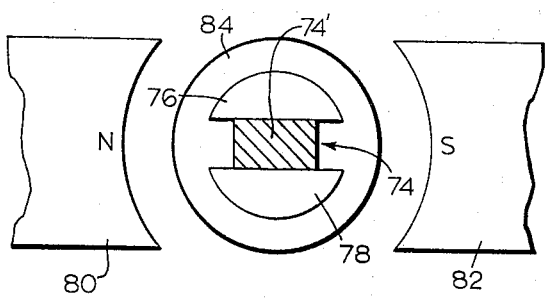
GERHARD H. BAUERLEIN
INVENTOR.
BY S. A. Giarratana
Francis L. Masselle
ATTORNEYS United States Patent Office 3,281,682
Patented Oct. 25, 1966

3,281,682
HALL EFFECT TACHOMETER USING AN EDDY-CURRENT ROTOR AND FLUX FOCUSING ELEMENTS
Gerhard H. Bauerlein, Passaic, N.J., assignor to General Precision Inc., Little Falls, N.J., a corporation of Delaware
Filed Nov. 6, 1962, Ser. No. 235,631
2 Claims. (Cl. 324—70)

The present invention relates to tachometers and more particularly to a tachometer which supplies an output voltage having a magnitude proportional to shaft speed.

A conventional D.C. tachometer makes use of a commutator and brush assembly for rectifying an A.C. signal generated in the rotating armature winding. The commutator and brush assembly thus can be considered as a mechanical rectifier in addition to serving as a means for electrically connecting wires to the rotating armature. A D.C. output proportional to shaft speed also can be obtained by rectifying the output of various types of conventional A.C. tachometers. The disadvantages of the D.C. tachometer are found in the mechanical switching arrangement (i.e., commutator and brushes). Some of thees disadvantages are high friction torque, ripple voltage in the output signal, curtailed life due to wear, and decreased reliability. The disadvantages associated with the rectification of the outputs of A.C. tachometers are poor linearity, displacement error at zero speed, and the fact that additional circuitry is required.

In accordance with one embodiment of the present invention, the foregoing disadvantages are overcome by using a Hall generator to sense the magnetic field changes in a rotor rotating relative to a stator producing a steady magnetic field. A current is generated in the rotor proportional to its speed of rotation, and the generated current in turn produces a magnetic field which is impressed across the Hall generator to vary the voltage output thereof proportional to the speed of rotation of the rotor. The rotor is the only rotating member and requires no electrical connection. Therefore, this device, when used as a D.C. tachometer, has no rotating contacts and the friction, ripple, wear and unreliability associated with rotating contacts are eliminated. Further, if an A.C. exciting current is applied to the Hall generator, the output voltage will have the same frequency as the exciting current. Therefore, the tachometer of the present invention is universal in that its is capable of D.C. or A.C. operation.

Accordingly, it is one object of the present invention to provide improved tachometers for producing an electrical output proportional to the speed of a rotating shaft.

It is another object of the invention to provide tachometers which can produce either a D.C. or A.C. output signal depending on whether a control current applied thereto is D.C. or A.C., respectively.

It is a further object of the invention to provide tachometers which produce a D.C. output without employing commutators and brushes.

It is a still further object of the invention to provide tachometers of the type described above which have only one moving part with no electrical connections made to the moving part.

It is a still further object of the invention to provide tachometers which employ a transducer, such as a Hall generator, to sense a magnetic field having a magnitude proportional to a shaft input speed.

It is a still further object of the invention to provide tachometers of the type described above which are simple and rugged in construction, economical to manufacture, and reliable and accurate in operation.

Other objects and features of novelty of the present invention will be specifically pointed out or will otherwise become apparent when referring, for a better understanding of the invention, to the following description taken in conjunction with the accompanying drawings, wherein;

FIG. 1 is a sectional view of a tachometer embodying features of the present invention;

FIG. 2 is a developed view of the surface of the rotor of the tachometer of FIG. 1;

FIG. 3 is a schematic view of the Hall generator of FIG. 1 and the electrical connections thereto;

FIG. 4 is a schematic view of a tachometer illustrating another embodiment of the invention;

FIG. 7 is a schematic view of still another embodiment of the invention.

Figure 5:
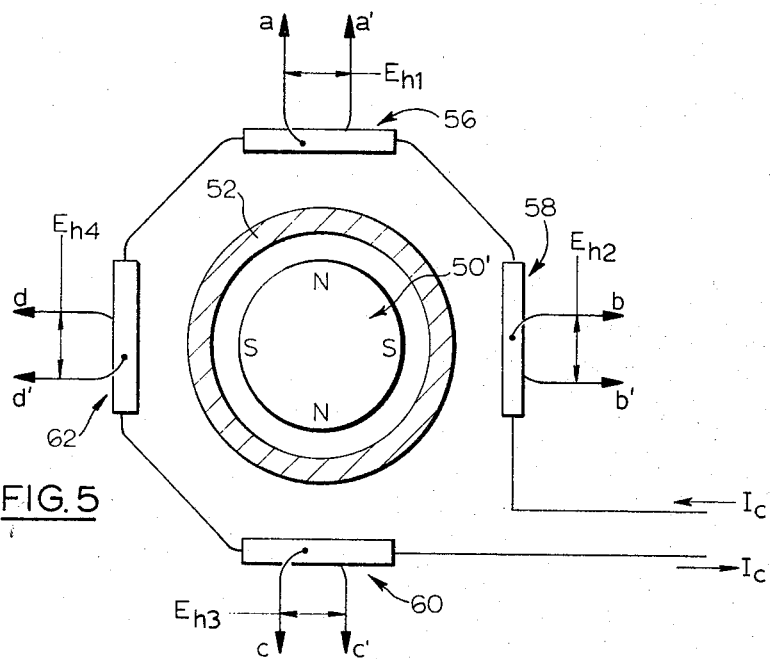
FIG. 5 is a schematic view of another embodiment of the invention.

Referring to FIG. 1 a tachometer 10 is illustrated which embodies features of the present invention. It comprises a cylindrical housing 12 having an end wall 14 on one end thereof and a cylindrical flange 16 on the other end thereof. A pair of axially spaced bearings 18 and 20 are fixed in the flange 16 and journal a shaft 22 projecting from the left end of a cup-shaped rotor 24 having a cylindrical wall 26 with the right end thereof open. A stator in the form of a magnet 28 is fixed within the rotor 24 by a pair of supporting members 30 and 32 fixed to the end wall 14 of the housing 12 and projecting into the rotor. A magnetic ring 34 is fixed in the wall of housing 12 overlying the poles of magnet 28 to provide a return path for the flux of the magnet. The rotor 24 is free to rotate with the cylindrical wall 26 thereof positioned in the air gap between the poles of the magnet and the magnetic ring 34.

A similar magnetic ring 36 is fixed in the cylindrical housing 12 axially displaced from magnetic ring 34. A pair of flux focusers 38 and 40 are positioned within the magnetic ring 36 to focus the magnetic field of the rotor across a Hall generator 42, as will be described. The flux focusers 38 and 40 are also fixed in position by the supporting members 30 and 32.

Referring to FIG. 2 the cylindrical wall of the rotor 24 has a plurality of overlapping shorted conducting coils 44 thereon with axial legs 44' traversing both the area circumscribing the fixed magnet and the area circumscribing the Hall generator. Consequently when rotor 24 is rotated by a shaft whose speed is to be monitored, coils 44 cut the lines of flux extending across the air gap between the poles of fixed magnet 28 and magnetic ring 34 to generate an induced current in the coils. This induced current in turn generates its own magnetic field which is focused across the Hall generator 42 by flux focusers 38 and 40 to vary the output voltage of the Hall generator in proportion to the speed of rotation of the rotor 24.

In lieu of coils 44, a plurality of axially extended parallel strips of conductive material, corresponding to the axial legs, 44', of the coils can be used. The strips are shorted at their respective ends by a single circumferential conductor which replaces the individual end loops of the coils.

Referring to FIG. 3, the output voltage $E_h$ from the Hall generator 42 is taken from one orthogonal axis lying in the plane of the generator while the exciting control current $I_c$ is applied across the other orthogonal axis lying in the plane of the generator. The flux B from the flux focusers 38 and 40 penetrates the Hall generator perpendicular to the plane thereof.

Other types of stators can be used to produce the fixed field generated by the magnet 28, such as an electromagnet, for example, and the rotor may be constructed by any other suitable technique which produces discrete conductors such as printed circuit techniques, for example. Similarly, the Hall generator may be replaced by any suitable sensing element or transducer which is sensitive to a magnetic field, such as for example, a second harmonic flux gate dector. Each of the rotor coils 44 may consist of a multitude of turns; the number of turns may be uniform or a larger number may be used in one tachometer section than another.

It is apparent that since no electrical connections need be made to the rotor 24, the tachometer 10 eliminates the commutator and brushes of previous D.C. tachometers along with their attendant disadvantages. Also, if the exciting current $I_c$ is a D.C. current, the electrical output of the generator will be a D.C. output and if the exciting current $I_c$ is an A.C. current the electrical output of the Hall generator will be an A.C. output having the same frequency as the frequency of the exciting current. Thus the tachometer 10 can function either as an A.C. or a D.C. tachometer.

As previously stated the permanent flux developed in the magnet 28 causes an E.M.F. to be created in the conducting coils 44 placed on the rotor. The magnitude of this voltage is:

where:

N is the number of turns $d\phi/dt$ is the change of flux with time $$e = -N\frac{d\phi}{dt}$$

If the magnet 28 produces a sinusodial flux where:

$\theta$ is the angular position around the air-gap circumference $$B = B_m \sin \theta$$

then:

$$\phi = BA = AB_m \sin \theta$$

where:

$\theta = wt =$ speed $\times$ time.

$$\phi = AB_m \sin wt$$

then voltage:

$$e = -N\frac{d(AB_m \sin wt)}{dt} = -NAB_m w \cos wt$$

and current:

$$I = \frac{e}{R} = \frac{-NAB_m w \cos wt}{R}$$

where:

$R =$ coil resistance which produces a flux $$\Phi_R = \frac{NI}{\mathcal{R}} = \frac{N^2 AB_m w \cos wt}{R\mathcal{R}}$$

where:

$\mathcal{R} =$ pickoff magnetic circuit reluctance.

Since the current flows through the entire coil, it produces a flux in the section containing the magnet 28 and in the section containing the Hall generator. The Hall generator output voltage $E_h = K_H I_c \Phi_\theta$ where $\Phi_\theta$ is the flux at an angular position $\theta$. Thus $$\Phi_\theta = \frac{N^2 AB_m w \cos \theta}{R\mathcal{R}_\theta}$$

where:

$\theta =$ angular position of pickoff axis $\mathcal{R}_\theta =$ relutance in the $\theta$ axis and $$E_h = K_H I_c \frac{N^2 AB_m w \cos \theta}{R\mathcal{R}_\theta}$$

where:

$I_c =$ Hall generator control current $K_H =$ Hall constant

All of the above are constants of the design except $I_c$ and $w$. Thus for any given $I_c$ reference current the output voltage $E_h = Kw$, where K is some constant and $w$ is shaft speed.

Referring to FIG. 4 another embodiment of the present invention is schematically illustrated which comprises a fixed magnet 50 having a conventional drag cup 52 positioned thereabout and rotable to cutlines of flux generated by the magnet 50. A Hall generator 54 is positioned adjacent to the drag cup 52 with its plane perpendicular to a radius of the drag cup and substantially parallel to the north-south axis poles of magnet 50. With this arrangement the electrical output of Hall generator 54 is at a null when drag cup 52 is not rotating as lines of flux produced by magnet 50 run generally parallel to the surface plane of the Hall generator, and no voltage or current is induced in the drag cup when it is not rotating. However, when the drag cup is rotated, cutting magnetic lines of flux, a current is induced therein which produces its own magnetic flux in quadrature with the main flux of magnet 50. The resultant flux penetrates the Hall generator and produces an electrical output $E_h$ which is porportional to the speed of rotation of the drag cup 52.

Figure 6:
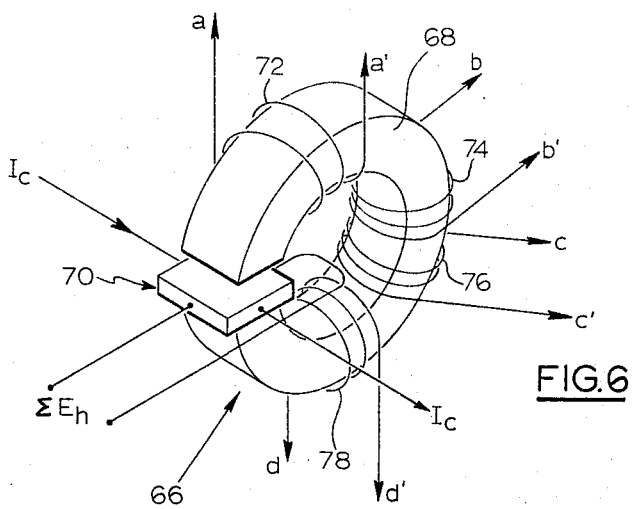
FIG. 6 is a perspective view of a summing device for summing the outputs of the plurality of Hall generators illustrated in FIG. 5.

Referring to FIG. 5, a construction similar to that of FIG. 4 is shown in which a plurality of Hall generators 56, 58, 60, 62 are placed in the magnetic circuit to yield additional output. The drag cup 52 is provided as before and magnet 50' differs in that it possesses two sets of north-south poles; these are arranged with alternating polarity in equi-angularly spaced relation about the rotary axis of the drag cup. The same exciting current $I_c$ is passed across each of the Hall generators to produce output voltages $Eh_1$, $Eh_2$, $Eh_3$ and $Eh_4$. The output voltage of each of the Hall generators varies in proportion to the speed of rotation of the drag cup 52; these output voltages are added in any suitable manner to produce one magnified output voltage. One device for adding the Hall voltages is shown and designated by reference numeral 66 in FIG. 6.

Summing device 66 comprises a magnetic ring 68 having a summing Hall generator 70 positioned in an air gap therein. A plurality of coils 72, 74, 76, 78 are positioned about the magnetic ring 68 and connected to the output voltages of the Hall generators 56, 58, 60, 62, respectively, i.e., by interconnection of correspondingly lettered leads $a$, $a'$; $b$, $b'$; $c$, $c'$; and $d$, $d'$ in FIGS. 5 and 6. Thus, the output voltage of the plurality of Hall generators produces a magnetic field in the magnetic ring which is proportional to the sum of $Eh_1$, $Eh_2$, $Eh_3$ and $Eh_4$. This field penetrates the summing Hall generator 70 to produce an output voltage $eE_h$ which is proportional to the sum of the individual Hall devices. Although in the embodiments of FIGS. 4 and 5 a drag cup such as that employed in conventional A.C. tachometers is used, other types of rotors also can be used, such as for example a disc with conductors thereon, a squirrel cage, or a solid core with conductors thereon.

Referring to FIG. 7 another embodiment of the invention is shown which comprises a Hall generator 74, the plate or crystal 74' of which appears in cross-section perpendicular to its major planar surfaces. Hall plate 74' is sandwiched between the flat diametral surfaces of a pair of hemicylindrical pieces 76, 78 of soft iron or similar magnetic material, the entire assembly being fixedly mounted in any suitable manner. Stationary north and south pole pieces 82 and 80 having concave pole faces are aligned on opposite sides of Hall generator 74 to produce a steady magnetic field extending generally parallel to the plane of Hall plate 74'. An induced current-carrying drag cup 84 is positioned about the Hall generator 74 in the air gap between the north and south poles.

When the drag cup 84 is not rotating the electrical output produced by the Hall generator is at a null. However, when the drag cup 84 is rotated to cut the lines of flux between the poles an induced current is generated therein which produces flux field in quadrature with the steady magnetic field between pole pieces 80, 82. The vertical component of the resultant flux field penetrates the Hall plate 74' to vary the electrical output of the generator in proportion to the speed of rotation of the drag cup 84. The faster the drag cup rotates the greater the displacement of the flux field and the greater the variation in the electrical output of the Hall generator.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed:

1. A tachometer comprising an electrically conductive cylindrical rotor mounted for rotation about its longitudinal axis; means within said rotor for generating a steady magnetic flux field directed radially outwardly with respect to said axis and linking said rotor to induce electrical current flow therein upon rotation of said rotor; magnetically permeable means, circumscribing said rotor and flux generating means; providing a magnetic return path for said steady flux field; diametrically-opposed, radially-extending flux-focusing members fixedly mounted within said rotor at a location axially displaced from said flux generating means, said members terminating short of said axis to define an air gap therebetween; a Hall plate disposed in said air gap with its major planar surfaces substantially perpendicular to the radial dimension of said flux-focusing members; and magnetically permeable means, circumscribing said rotor and flux-focusing members, providing a magnetic return path for flux generated in said flux-focusing members by induced electrical current in said rotor.

2. A tachometer comprising a hollow cylindrical member mounted for rotation about its longitudinal axis; magnet means, fixedly disposed within said hollow member, having pole ends of opposite polarity disposed in close proximity to the inner surface of the circumferential wall of the hollow member at spaced locations about said axis, magnetically permeable means defining arcuate flux-return paths coaxially circumscribing said hollow member and magnet means and extending between pole ends of opposite polarity; a pair of flux-focusing members fixedly mounted within said hollow member at a location axially displaced from said magnet means, said flux-focusing members extending radially outwardly in opposite directions with respect to said longitudinal axis, the respective outer ends of said flux-focusing members being disposed in close proximity to said inner surface of the hollow cylindrical member, the inner ends of said flux-focusing members being spaced to define an air gap therebetween; a Hall plate disposed within said gap with its major planar surfaces substantially normal to the radial axes of said flux-focusing members; an annulus of magnetically permeable material coaxially circumscribing said hollow member and flux-focusing members to provide a return path for magnetic flux in said flux-focusing members; and means defining on said circumferential wall of the hollow cylindrical member a plurality of close electrical paths, angularly-spaced about said longitudinal axis and having longitudinal segments traversing the regions of said wall circumscribing both said magnet means and flux-focusing members.

References Cited by the Examiner

UNITED STATES PATENTS

| | | | |
|---|---|---|---|
| 3,018,395 | 1/1962 | Carlstein | 324—70 |
| 3,299,202 | 1/1966 | Wenk | 324—70 |

WALTER L. CARLSON, *Primary Examiner.*

FREDERICK M. STRADER, *Examiner.*

C. W. HOFFMANN, M. J. LYNCH,
*Assistant Examiners.*